United States Patent [19]

de Vecchis et al.

[11] 4,156,624
[45] May 29, 1979

[54] MANUFACTURE OF OPTICAL FIBRE CABLES WITH SIMULTANEOUS LAYING

[75] Inventors: Michel de Vecchis; Maurice Arnaud, both of Paris, France

[73] Assignee: Lignes Telegraphiques et Telephoniques, Paris, France

[21] Appl. No.: 897,714

[22] Filed: Apr. 19, 1978

[30] Foreign Application Priority Data

Apr. 27, 1977 [FR] France .................................. 77 12674

[51] Int. Cl.² ............................ G02B 5/14; B32B 5/02
[52] U.S. Cl. ......................................... 156/171; 57/13; 156/172; 156/244.12; 156/244.15; 156/285
[58] Field of Search ................ 156/166, 171, 172, 169, 156/149, 285, 497, 425, 428, 429, 47, 53, 55, 293, 294, 298, 244.12, 244.15, 244.13; 57/13, 15; 350/96.23

[56] References Cited

FOREIGN PATENT DOCUMENTS

| 2519050 | 4/1976 | Fed. Rep. of Germany ........ 350/96.23 |
| 2509547 | 9/1976 | Fed. Rep. of Germany ........ 350/96.23 |
| 2312788 | 12/1976 | France .................................. 350/96.23 |

*Primary Examiner*—Michael W. Ball
*Attorney, Agent, or Firm*—Kemon & Estabrook

[57] ABSTRACT

A cable comprising a central armour, a dielectric helically grooved core and an optical fibre housed in each one of the plurality of the grooves is produced by extrusion of the profiled core on the armour, pulling vertically the core through an annular laying unit comprising a plurality of take off reels supplying optical fibre guiding each of said fibre within one of the grooves by mechanical and pneumatic means and taping fibre filled core.

5 Claims, 7 Drawing Figures

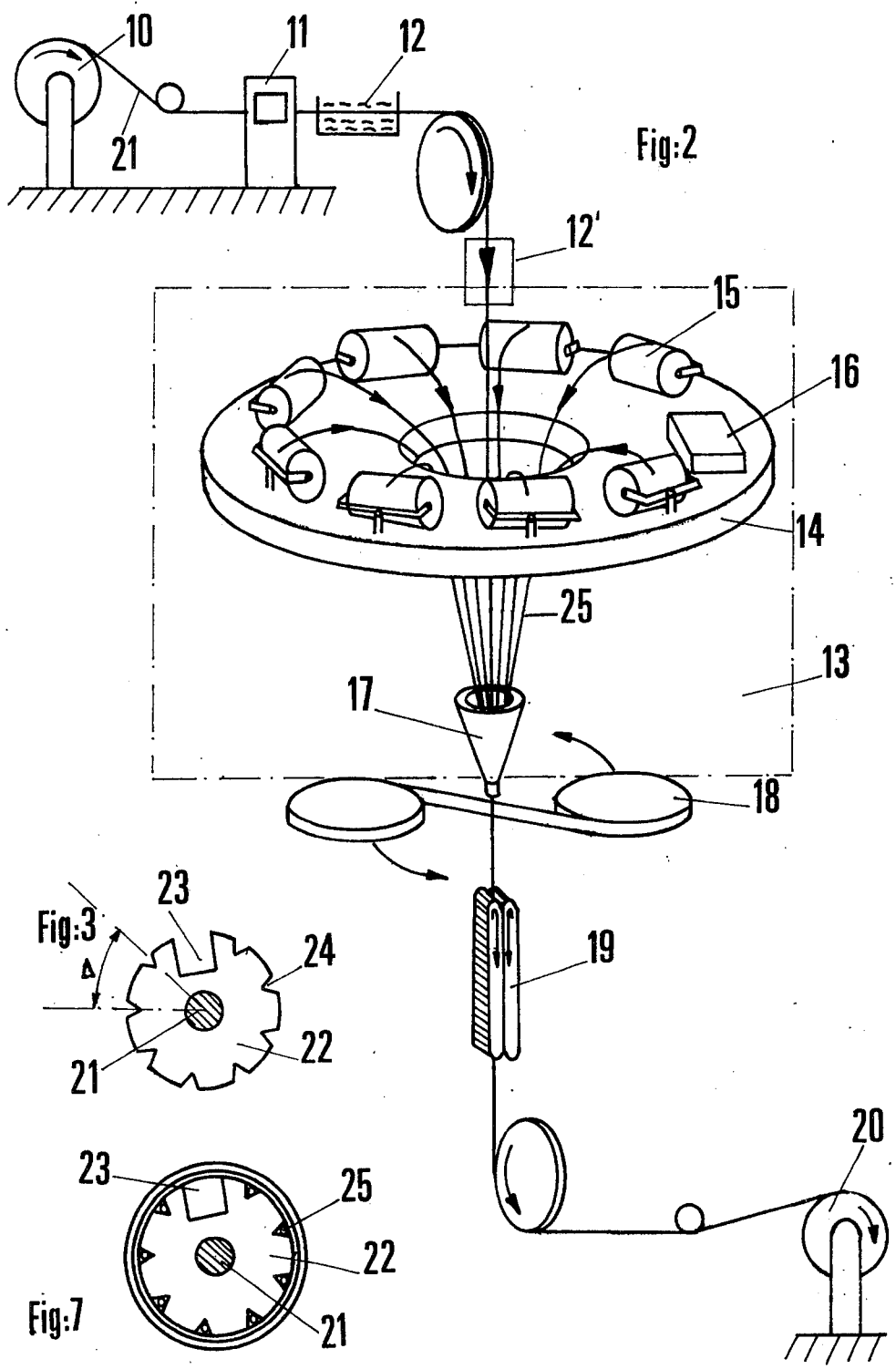

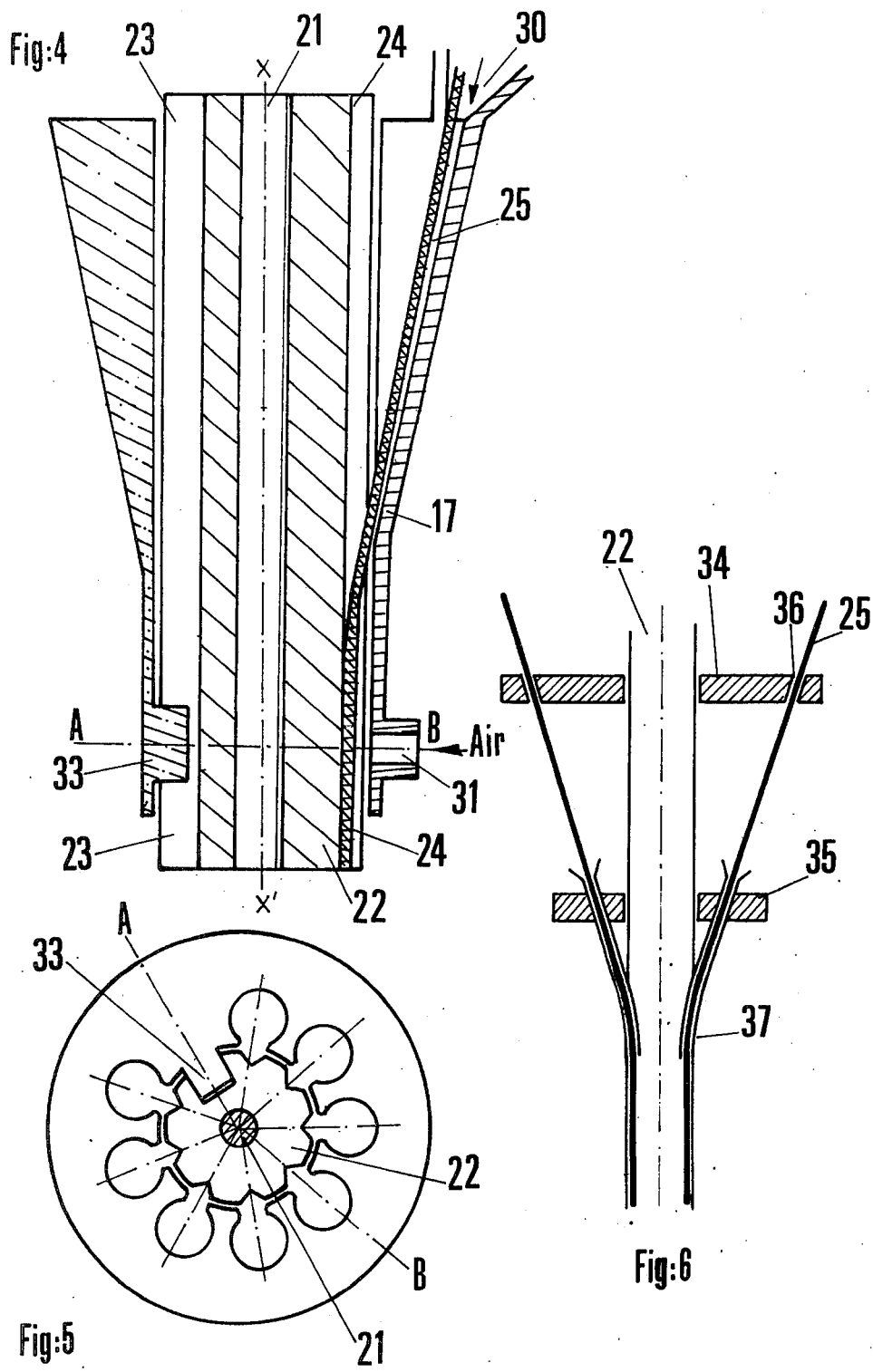

MANUFACTURE OF OPTICAL FIBRE CABLES WITH SIMULTANEOUS LAYING

BACKGROUND OF THE INVENTION

The invention concerns the manufacture of cable elements utilizing optical fibres for the transmission of signals.

What is hereinafter called a cable element has already been described for instance in the French Patent Application No. 2,358,666 filed on Dec. 30, 1975 and the U.S. patent application Ser. No. 877,872, filed on Feb. 15, 1978, for "Cable incorporating optical fibres" by one of the co-inventors. The cable structure comprises an armour of high mechanical strength on which a plastic material core is extruded whose cross-section shows helical grooves serving to house optical fibres laid lengthwise. Subsequent envelopes or sheathings surround a such element of a strand of such elements to form a cable in known manner. Such a cable element will hereinafter be referred to as an "element".

SUMMARY OF THE INVENTION

The process for the manufacture of cable elements of the type under consideration according to the invention is characterized by the following steps:
horizontal pulling of the armour of high mechanical strength,
extruding a dielectric plastic core in accordance with the grooved profile of the element,
cooling the core,
drying and preheating the core,
turning the core along a vertical axis through a horizontal annular carrier supporting a set of optical fibre supply reels,
simultaneous guiding each optical fibres within a groove of the core under the combined action of gravity and of forces exerted by a gas under pressure,
taping the core,
pulling the core along the vertical axis,
taking up the element on a reel of horizontal axis.

A first apparatus for carrying out the process of the invention, comprising a supply reel containing the armour of the element, a core extruder and a heat treatment unit, is characterized in that it comprises means for pulling the core vertically through a horizontal circular carrier having a central aperture for the passage of the core rotating around it at N revolutions per second, N obeying the relation $N = v/p$, where v is the speed of the core and p the pitch of the helical grooves, the said carrier supporting the optical fibre supply reels delivering fibre to a guide fast with the carrier, which comprises at least one air inlet nozzle opposite each optical fibre, so as to fit it into the groove intended to receive it, a taping unit, means for pulling in one direction of the horizontal plane, and a take-up means.

A second apparatus for carrying out the process comprises a fixed fibre reel carrier and rotating supply and take-up means.

The process according to the invention affords the following advantage: it makes it possible to produce elements in which the stress on the optical fibres has been reduced to a minimum, because not only are the optical fibres fed at a speed which is a function of the speed of pull on the element, but in addition they are helically wound at the pitch of the grooves and pushed towards the base of the grooves without having to undergo any friction. The preheating of the core before laying the fibre brings about an expansion of the grooves, which facilitates the positioning of the fibres and reduces the residual tension on the fibres. In some cases, it even is possible to maintain a negative tension (compression) on the fibres as a result of the difference between the expansion coefficients of the fibres and of the core. The dimension of the optical fibres is such that the rotating reel carrier can readily be produced and the speed of rotation can be high, permitting a high linear pull speed without necessitating any complex mechanical control means.

BRIEF DESCRIPTION OF THE DRAWINGS

The description of the process according to the invention is accompanied by FIGS. 1 to 7, which are given by way of illustration and have no limiting character, and in which:

FIG. 2 is an overall view of the apparatus for carrying out the process according to the invention, FIG. 3 is a transverse section through the core after extrusion, FIG. 4 is a longitudinal section through the fibre guide, FIG. 5 is a transverse section through the fibre guide, FIG. 6 is a longitudinal section through a variant of the guide, and FIG. 7 is a transverse section through the completed cable element.

FIGS. 1 and 2 illustrate respectively the sequence of the operations of the process according to the invention and a corresponding apparatus for carrying it out.

DETAILED DESCRIPTION OF THE DRAWINGS

Figure 1:
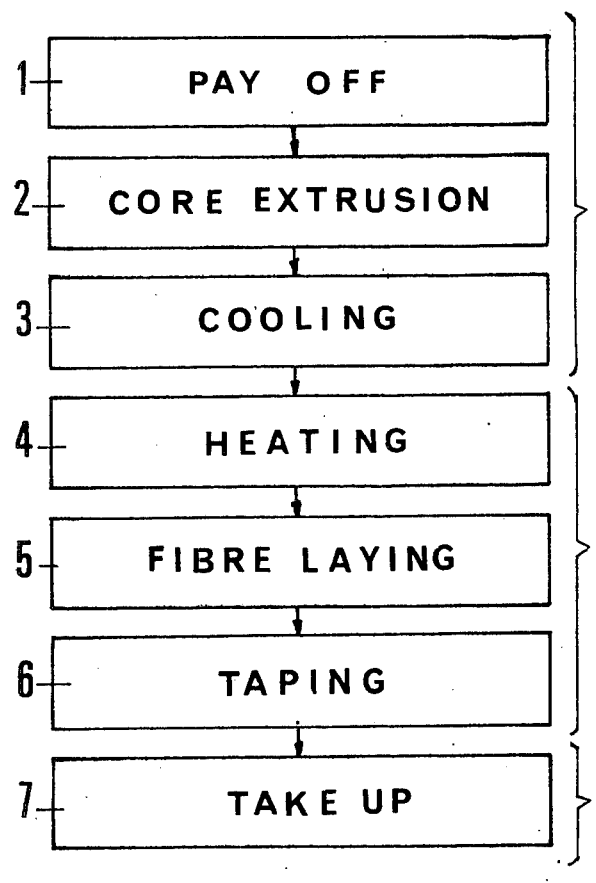
FIG. 1 illustrates the sequence of the operations of the process according to the invention.

Operation 1 is the pay off of the central armour of high mechanical strength from the reel 10 of FIG. 2 in one direction of the horizontal plane under the action of a pulling unit situated downstream and represented by the caterpillar 19.

Operation 2 is the shaping of the dielectric core through extruder 11. FIG. 3 is a transverse section through the cable element after extrusion. In this section, 21 denotes the central armour of the element consisting of a single longitudinal wire, 22 denotes the thermoplastic dielectric core, 23 denotes a positioning slot of rectangular cross-section, and 24 denotes one of the grooves intended to house an optical fibre. The slot 23 and the grooves 24 wind helically in parallel relation on the surface of the core 22 with a pitch p at a constant angular spacing equal to $\Delta$ degrees.

Operation 3 is the heat treatment of the core, which consists in cooling it in the water tank shown at 12. This operation is succeeded by drying in hot air at 12, which is intended to preheat the core in order to expand it.

Operation 5 is the laying of all the optical fibres simultaneously by means of the unit 13 of FIG. 2 on the preheated extruded core pulled vertically. Unit 13 consists of a circular carrier 14 having a central aperture for the passage of the element. It performs N revolutions per second, N being given by the relation $N = v/p$, where v is the speed of travel of the element and p the pitch of the helical grooves provided in the dielectric core. Carrier 14 supports pay-off reels 15 supplying the optical fibres, the rate of feed of which is controlled as a function of the line speed of the pitch and of the diameter of the fibre on the reel. The rotation of 14 is controlled by an optical device 16 associated with the slot 23. The fibres are positioned in the grooves of the extruded core by means of the guide 17, two variants of which are shown in FIGS. 4 and 6. FIG. 5 is a transverse section through the guide 17 along a plane A–B in FIG. 4. The guide 17 has a finger 33 emgaged in the positioning slot 23, so that it precisely follows the position of the core and more particularly any rotation which might occur. FIG. 4 illustrates an optical fibre 25 engaged at its lower end in a groove 24 in the dielectric core 22. A jet of air blown by the nozzle 30 and directed from the top downwards pushes the fibre and prevents any friction with the groove. A second jet of air applied by way of the lower nozzle 31 applies the fibre in the groove 24 at the lower end of the fibre guide 17.

Operation 6 is a taping operation performed immediately after the outlet from the guide 17, diagrammatically indicated at 18 in FIG. 2.

Operation 7 is the take-up of the cable element on to the reel 20.

A variant of the invention consists in using a rotating supply means by which the central core is fed to an extruder with rotating tooling, the carrier 14 being maintained fixed. The cabling element is pull along by a rotating caterpillar and the element is reeled on a rotating take-up unit. The various elements of this variant, like those of the preceding variant, are commonly used cable making machines, except for the fibre guide 17.

In the fibre guide variant illustrated in FIG. 4 and shown in section in FIG. 5, the central armour 21 provided with the dielectric core 22 passes through the interior of a frustoconical fibre guide 17, of which the internal face is formed with grooves having an omega-shaped profile (cf. FIG. 5), in which the optical fibres, such as 25, supplied by the reels 15 are engaged. The internal face of 17 has, in its narrower portion, a finger 33 which engages in the positioning slot 23 in the core and ensures that the angular position of the fibre guide 17 is determined by that of the core 22. The optical fibres are carried downwards by a jet of air under pressure delivered by nozzle 30. When preheating of the core to provide expansion before laying the fibres, it is preferable to heat the blown-in air in order to avoid cooling of the core. A second jet of air blown in through nozzle 31 pushes the fibre into the registrating groove 24. When the laying has been effected along the tangent to the helix constituted by the groove, the fibre is at a constant angle in relation to the axis X—X and the laying can be carried out without any force being applied to the fibre. The fibre guide 17 does not turn in relation to the core, since the finger 33 maintains the fibre guide fast with the core. The transverse dimensions of the grooves in the internal face of the fibre guide decrease in proportion as its diameter decreases.

The variant illustrated in FIG. 6 comprises a fibre guide composed of two concentric crowns 34 and 35 having central apertures for the passage of the core 22. The periphery of the upper crown is formed with apertures such as 36 serving for the passage of an optical fibre such as 25. Situated in the periphery of the lower crown 35 are apertures in which are engaged the upper ends of capillaries such as 37, through which the optical fibres are supplied. The lower part of these capillaries rests in the registrating groove in the core 22. The use of such a fibre guide makes it possible to eliminate the positioning slot 23 in the extruded profile, the fibre guide being controlled by the capillaries.

Laying with alternate pitches can be obtained by rotating the annulus 14 through ± 180 degrees.

In the two described variants of the fibre guide, the tolerance on the diameter of the extruded core must be known so that the internal diameter of the fibre guide in its lower part is close to the maximum diameter of the core, taking into account the thickness of the fibres which have not yet entered their groove. By expansion of the sheathing by preheating, it is possible to reduce the clearance, and an operation for calibrating the sheathing before it enters the fibre guide may be introduced.

By application of the process of the invention, it has been found possible to produce cables of the type illustrated in FIG. 7 at a line speed between 1 and 4 m/min. The rotation of the core is made such as to obtain a pitch of about 200 mm for the grooves 23. At the minimum value of the aforesaid line speed, the rotation is 5 r.p.m. The optical fibre supply reels are of two sizes, namely of 165 mm and 380 mm in diameter respectively. The various stations for the application of the process utilize commercially obtainable cable-making machines.

What we claim is:

1. Process for the manufacture of cable elements comprising a central armour, a helically grooved extruded core on said armour, optical fibres within said grooves and a protective tape, characterized by the following steps:

horizontal pulling of the armour of high mechanical strength, extruding a dielectric plastic core in accordance with the grooved profile of the element, cooling the core, drying and preheating the core, turning the core along a vertical axis through a horizontal annular carrier supporting a set of optical fibre supply reels, simultaneous guiding each optical fibres within a groove of the core under the combined action of gravity and of forces exerted by a gas under pressure, taping the core, pulling the core along the vertical axis, taking up the element on a reel of horizontal axis.

2. Process for the manufacture of cable elements according to claim 1, wherein the means for the supply of optical fibre, the extrusion, the taping, the pulling and the take-up of the element are rotating, and the armour core not rotating.

3. Process for the manufacture of cable elements of the type under consideration according to claim 1, wherein the carrier supporting the optical fibre reels turns about a vertical axis.

4. Process for the manufacture of cable elements as recited in claim 1, wherein the guiding of the fibres is effected by a frustoconical member having in its upper part of maximum diameter a series of vertical nozzles communicating with grooves of omega-shaped profile whose dimensions decrease with their distance from the upper part and which are machined in its internal face, and a series of horizontal nozzles on the lower part, also communicating with the slots, said fibres are through the grooves of said member by the air expelled by said vertical nozzle and pass into the grooves of the cable core, said member carries a centering pin cooperating with a positioning slot in the core.

5. Process for the manufacture of cable elements as recited in claim 1, wherein the guiding of the fibres is effected by a set of two coaxial crowns disposed one below the other and coaxial with the cable, the upper crown having a series of apertures through which the optical fibres are engaged and having a diameter which is large in relation to that of the core, the lower crown being of similar diameter as the core of the cable and having apertures in its internal face carrying one end of a plurality of capillaries, the other end of which is introduced into one core groove said capillaries being passed through by the fibres.

* * * * *